Jan. 13, 1925.
A. GUTZWILLER
TUBE CONNECTION
Filed Jan. 6, 1920
1,523,194
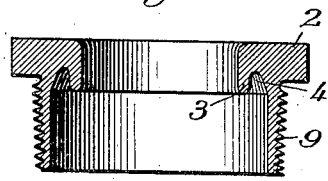
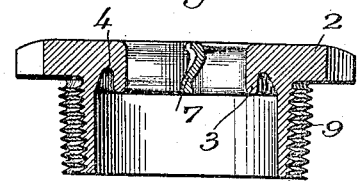
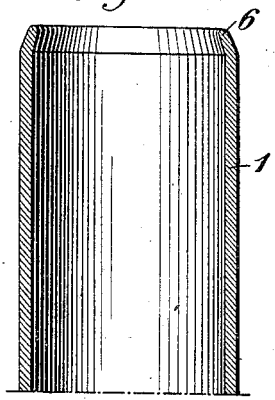
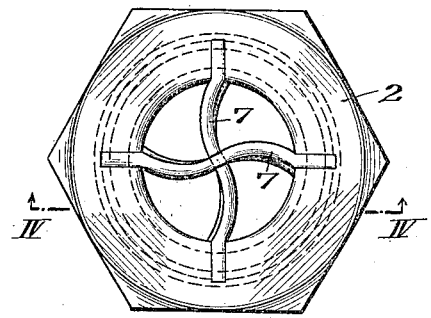
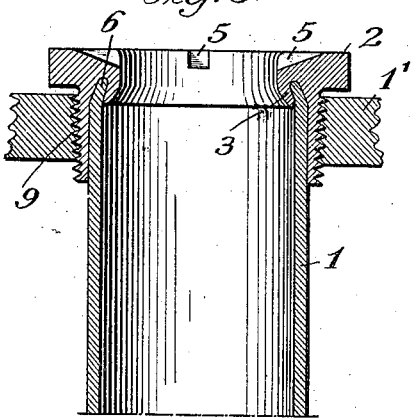
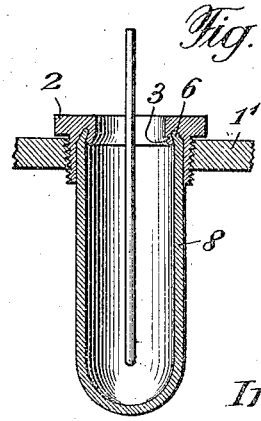
Inventor:
Adolf Gutzwiller
By Henry Orth Jr.
Atty.

Patented Jan. 13, 1925.

1,523,194

UNITED STATES PATENT OFFICE.

ADOLF GUTZWILLER, OF WALLISELLEN, SWITZERLAND.

TUBE CONNECTION.

Application filed January 6, 1920. Serial No. 349,780.

*To all whom it may concern:*

Be it known that I, ADOLF GUTZWILLER, a citizen of the Republic of Switzerland, residing at Wallisellen, Alte Winterthurerstrasse 143, Switzerland, have invented certain new and useful Improvements in Tube Connections; and I do hereby declare the following to be a clear, full, and exact description of the invention, such as will enable others skilled in the art to which it appertains to make and use the same, reference being had to the accompanying drawing, and to letters or figures of reference marked thereon, which form a part of this specification.

The invention relates to heat interchange devices such as cooling devices, steam boilers, etc., of the type in which tubes are either arranged between two tube plates or in one tube plate.

In the hitherto known arrangements with two tube plates either both ends of the tubes have been provided with screw threads and have been screwed into the tube plates when the tubes had to serve as stay tubes, or smooth tubes have been beaded into smooth bores of the tube plates.

In the case of condenser tubes one end of the tubes had been usually carried in a kind of stuffing box.

The invention relates to a heat interchange device with tubes inserted in tube plates wherein each end of the tubes is provided with a short reducing taper and is held in position in the tube plate by means of a nut containing a bore, the inner edge of which overlaps the conical end of the tube and is expanded over said end.

The drawing shows by way of example several modes of carrying the invention into effect, in which—

Fig. 1 is a longitudinal section through the end of a tube.

Fig. 2 represents a nut before it is expanded.

Fig. 3 shows a tube inserted in a tube plate and the expanded nut.

Fig. 4 is a section along line IV—IV of Fig. 5 of a nut fitted with a twisted crosspiece.

Fig. 5 is a top view of the nut shown in Fig. 4.

Fig. 6 is a section through another exemplification of the invention.

In the first example (Figs. 1 and 2) 1 is a tube, the end of which, as shown in the drawing, is slightly bevelled and tapered down, 2 is an annular nut provided with outside thread.

The nut is provided with a circular recess 4, the outer wall of which corresponds to the outer wall of the conical end of the tube, whilst the inner edge 3, defining the recess is dimensioned in such a way, that the nut may be placed over the end of the tube, the taper projecting then into the recess. The screw nut 2 is provided with a slightly conical outer thread 9 and is screwed into a corresponding thread of the tube plate 1' (Fig. 3) until the conical end 6 of tube 1 rests against the bottom of the recess of the nut. After that the edge 3 of the recess 4 is threaded onto the inner surface of the conical end 6. In this way a tube 1 is secured in a totally tight and reliable manner to the tube plate 1'. The edge part of the screw nut beaded on the tube forms an equivalent to the tube ferrules used with boilers.

The exemplification of the invention illustrated in Fig. 3 shows the provision of slots to the nut intended to take up correspondingly arranged pins of a pin spanner.

The expanded edge 3 causes a contraction and a subsequent widening of the section whereby the effect of De Laval nozzles may be attained on the medium flowing through the passage for the purpose of heat interchange for instance on heating gases if said edge is designed properly, the outer edge of the bore of the nut being preferably rounded off slightly to this end, as shown at 10. The consequence of this nozzle effect is an increase in the velocity of flow of the heating gases through the tubes and therefore an improved efficiency of the heat interchange.

The provision of the slots 5 (Fig. 3) is necessitated in case of a small pitch of the holes in the tube plates which renders the use of hexagon nut and socket wrenches impossible. In these slots for the spanners twisted cross pieces 7 may be fixed which impart a rotary motion to the medium flowing through the tubes, which motion further improves the efficiency of the heat interchange device.

It is even possible to choose the internal diameter of the nut to adjust the quantity of the medium passing through the different rows of tubes of cooling devices in accordance with the determined drop of temperature inside the cooling device by dimentioning the bore of the nuts of the different rows of tubes accordingly.

Allowance is made for the alterations in length of the tubes of heat interchange devices with tubes inserted into two tube plates in bending the upper nests of tubes in an upward direction and the lower nest of tubes in a downward direction; the insertion of the bent tubes does not provide any difficulty as the bores of the holes for taking up the screw nuts in the tube plates are comparatively large.

The invention may also be made use of with tubes that are only fixed in one tube plate as is the case with Field tube boilers or with the so-called pocket coolers used in vessels in the chemical industry. This modification is shown in Fig. 6 in which 8 designates a tube which is open at one end only and inserted into a tube plate 1' in the manner hereinbefore described.

I claim:

1. Means for securing tubes in tube sheets, comprising an externally threaded nut having a central passage and a short, deformable flange spaced from the inner wall of said threaded portion, whereby the interior of said threaded portion will fit the end of a tube and said deformable flange may be in swaged connection with the tube, the inner surface of said flange forming a continuation of the passage through the nut.

2. Means for securing tubes in tube sheets, comprising an externally threaded nut having a central passage therethrough, and a deformable flange shorter than said threaded portion and spaced from the inner wall of said portion to form a groove, the outer wall of said groove being conical and the inner wall of said groove forming a surface bounding the opening through the nut.

3. Means for securing tubes in tube sheets, comprising an externally threaded nut having a central passage, and a groove near its outer end forming a short deformable flange within the nut extending longitudinally thereof, the outer wall of said groove being conical for the reception of the reduced, tapered end of a tube.

4. Means for securing tubes in tube sheets, comprising an externally threaded nut having a central passage, and a groove near its outer end forming a short deformable flange within the nut extending longitudinally thereof, the outer wall of said groove being conical for the reception of the reduced tapered end of a tube.

5. Means for securing tubes in tube sheets, comprising an externally threaded nut having a cylindrical central passage therethrough rounded on its outer end, said nut having a groove forming a longitudinally extending, deformable flange in said passage, the outer wall of said groove being conical.

6. In combination, a tube sheet having a threaded tube opening, a tube having a reduced and tapered end, and an externally threaded nut for said opening having a central passage, said nut having a groove, and a deformable flange extending longitudinally of said nut within said passage, the outer wall of said groove corresponding in conicity to the taper of said tube.

In testimony that I claim the foregoing as my invention, I have signed my name

DR. ADOLF GUTZWILLER.